United States Patent [19]

Zhang et al.

[11] Patent Number: 5,434,019

[45] Date of Patent: Jul. 18, 1995

[54] NICKEL-HYDRIDE BATTERY USED FOR BATTERY-OPERATED VEHICLES

[75] Inventors: Yunshi Zhang, Nankai University; Youxiao Chen, Tianjin; Deying Song, Nankai University; Jun Chen, Nankai University; Xuejun Cao, Nankai University; Genshi Wang, Nankai University; Zuoxiang Zhou, Nankai University; Huatang Yuan, Nankai University, all of China

[73] Assignee: Sunlee Hi-Tech Industry Co. Ltd. of NanKai University, Tianjin, China

[21] Appl. No.: 138,326

[22] Filed: Oct. 18, 1993

[30] Foreign Application Priority Data

Oct. 19, 1992 [CN] China ................ 92112168.7

[51] Int. Cl.$^6$ .................. H01M 4/36; H01M 4/80
[52] U.S. Cl. ................... 429/10; 429/206; 429/223; 429/241; 429/245
[58] Field of Search .............. 429/101, 223, 233, 235, 429/236, 237, 241, 242, 211, 245, 206, 218, 232; 428/613; 420/900

[56] References Cited

U.S. PATENT DOCUMENTS

| | | | |
|---|---|---|---|
| 3,923,545 | 12/1975 | Margulies et al. | 429/211 |
| 3,989,539 | 11/1976 | Grabb | 429/241 |
| 4,251,603 | 2/1981 | Matsumoto et al. | 429/94 |
| 4,994,334 | 2/1991 | Ikoma et al. | 429/206 |
| 5,077,149 | 12/1991 | Ikoma et al. | 429/101 |
| 5,100,747 | 3/1992 | Hayashida et al. | 429/101 |
| 5,244,758 | 9/1993 | Bronoel et al. | 429/223 |

FOREIGN PATENT DOCUMENTS

| | | |
|---|---|---|
| 0058082A1 | 8/1982 | European Pat. Off. . |
| 0384945A1 | 9/1990 | European Pat. Off. . |
| 0490791A1 | 6/1992 | European Pat. Off. . |
| WO8103583 | 12/1981 | WIPO . |

*Primary Examiner*—Anthony Skapars
*Attorney, Agent, or Firm*—Hill, Steadman & Simpson

[57] ABSTRACT

This invention relates to a nickel-hydride alkaline battery. In the battery, both negative and positive electrodes use an electrode plate with a net structure to solve the problems of high internal resistance, current collecting and heat releasing. The battery can be used practically as a starting and driving power for electric automobiles.

5 Claims, 2 Drawing Sheets

NICKEL-HYDRIDE BATTERY USED FOR BATTERY-OPERATED VEHICLES

BACKGROUND OF THE INVENTION

The present invention relates to a nickel-hydride alkaline battery, particularly to electrodes of the alkaline battery.

Many efforts have been put into research for developing batteries used as driving power for vehicles, such as automobiles, since the oil crisis. To meet the requirements as driving power for vehicles, batteries have to show good performance with respect to power, energy density and service life. It has been found that nickel-hydride batteries have high electric capacity, high energy density and long service life with less pollution and quick charge-discharge ability. Various studies have focused on nickel-hydride batteries as driving power for vehicles in countries all over the world.

Up to the present, hydrogen storage alloy materials used in nickel-hydride batteries include rare earth system, titanium system. calcium system, magnesium system and zirconium system, etc. Specifically, the electrodes using material of a rare earth system, such as hydrogen storage alloy, have been practically adopted in AA type batteries. The electric capacity reaches 1280 mAh, and the energy density reaches 58 Kg/wh.

In theory, the hydrogen storage materials of a rare earth system are good active materials of negative electrodes used in larger capacity batteries for vehicles. When the hydrogen storage alloy of a rare earth system is used as the materials of electrodes, it is necessary to pulverize the alloys into powder to a size of 300–500 meshes, then the powder is pasted on to the foam nickel to form a plate of a negative electrode. However, the electric current density on the plate of the negative electrode is not uniformly distributed, with lower electric current density in the place far away from an electrode ear and higher electric current density in the place near the electrode ear. It may not cause a lot of problems when these electrodes are used in AA type batteries. But when these electrodes are used in the batteries with large capacity (in general, the electric capacity >20 AH), the internal electric resistance of the electrode plates, particularly in the areas close to the electrode ear, increses so higher during discharging in large current that the electrode plates produce a large amount of heat which causes the electrode plates to deform or even be damaged, and the electrode plates may not be further used. So far there has been no report of the solution to this problem.

SUMMARY OF THE INVENTION

An object of the present invention is to provide a new nickel-hydride battery with large capacity used practically as starting and driving power for electric powered automobiles.

Another object of the invention is to provide a new type of negative and positive electrode used in the batteries.

Further and other objects may be seen from the following detailed description of the invention.

According to the present invention, a nickel-hydride battery comprises a container, a negative hydrogen storage alloy electrode, a positive electrode, a separator and an electrolyte. Both the negative electrode and the positive electrode have an electrode plate with a metal net for current collecting. The net has a plurality of stems and branches and a protruded ear at one side of the net.

DETAILED DESCRIPTION OF THE PRESENTLY PREFERRED EMBODIMENTS

According to the present invention, an electrode for a nickel-hydride battery comprises an electrode plate and an active material attached to or pasted on the electrode plate. The electrode plate comprises a foam nickel-coated metal net with a protruded ear at one end for current collecting. The net is formed by a plurality of stems with a plurality of branches linked to the stems. Most of the stems are diverging from the ear towards the edges of the net.

It is preferred that the stems are thicker than the branches, and the stems become thinner when they extend from the end near the ear to form a root-like structure. It is also preferred that the metal has a good conductivity and can be easily coated with nickel. Examples of the metal are nickel, copper, aluminum, etc.

The size of the net depends on the size of the electrode plate which will be decided according to the capacity of the battery where it is used.

The thickness of the net for current collecting is, in general, 0.5–1.5 mm. When the thickness of the net is less, it will be easily broken.

The idea of making a root-like net comes from the function of a root which can absorb water from deep soil through its branches and collect water at truck.

By using the root-like net in the electrode, electric current may be collected from the corners or edges of the net through the branches, and flow to the protruded ear. Because the conductive cross section near or at the ear is larger, the electric resistance is lower and no deformation of the electrode results. This gives an ideal solution to the problems of the electrode plate, such as, high internal resistance, current-collecting and heat releasing etc, when the electrode plate is used in a large capacity of the nickel-hydride battery. Therefore, the nickel-hydride battery using the electrode plate with the net structure according to the invention may be used as a starting and driving power for electric automobiles.

According to the invention, a nickel-hydride battery comprises a container, a negative hydrogen storage alloy electrode, a positive electrode, a separator and an electrolyte. The negative electrode is formed by the electrode of the invention using a rare earth system alloy as the active material. The positive electrode is made by the electrode of the invention using a nickel oxide as the active material. It is preferred that the ear is on the top of the electrode plate when the electrode plate is assembled in the battery.

According to the invention, the electrode, for example, the electrode with a root-like structure, may be made in the following way: selecting a suitable size of metal plate, such as, nickel plate, copper plate or aluminum plate, with a thickness of 0.5–1.5 mm, punching the metal plate by a conventional punching machine to form a root-like net (referring to FIG. 2), then the plate is coated with nickel by an electric plating method to thicken the plate.

Figure 3:
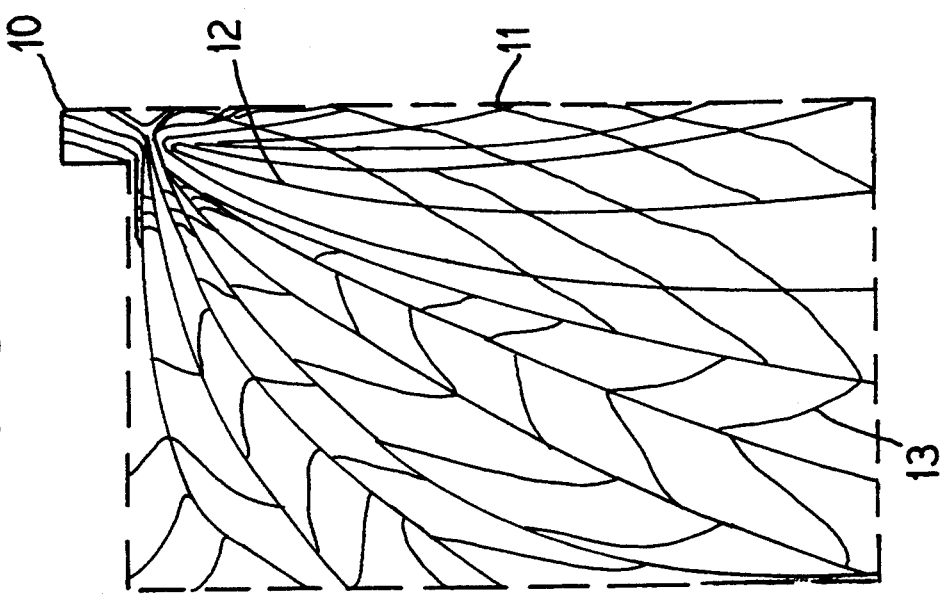
FIG. 3 is a schematic plan view of the root-like electrode plate for current-collecting after electric plating according to the invention.

Since the electric current density is different from place to place in the net during the electric plating, the thickness of the coating on the net plate is also different, which makes the net more close to a root-like structure after the electric plating (referring to FIG. 3). The plate after the electric plating is placed between two pieces of foam plastic to be coated with nickel by chemical plating. The thickness of the foam plastic is half as thick a the electrode plate.

After the chemical plating, the foam plastic is burned out to form a foam nickel coated net with a root-like structure. On the top of the net is the ear which will be used as a contact of the battery when it is assembled.

A negative electrode may be made by pasting, in a conventional manner, a hydrogen storage alloy powder of a rare earth system on the electrode plate. A positive electrode may be made by pasting, in a conventional manner, nickel oxide on the electrode plate.

Now, this invention will be further described in detail in accordance with the following examples:

EXAMPLE 1

Figure 1:
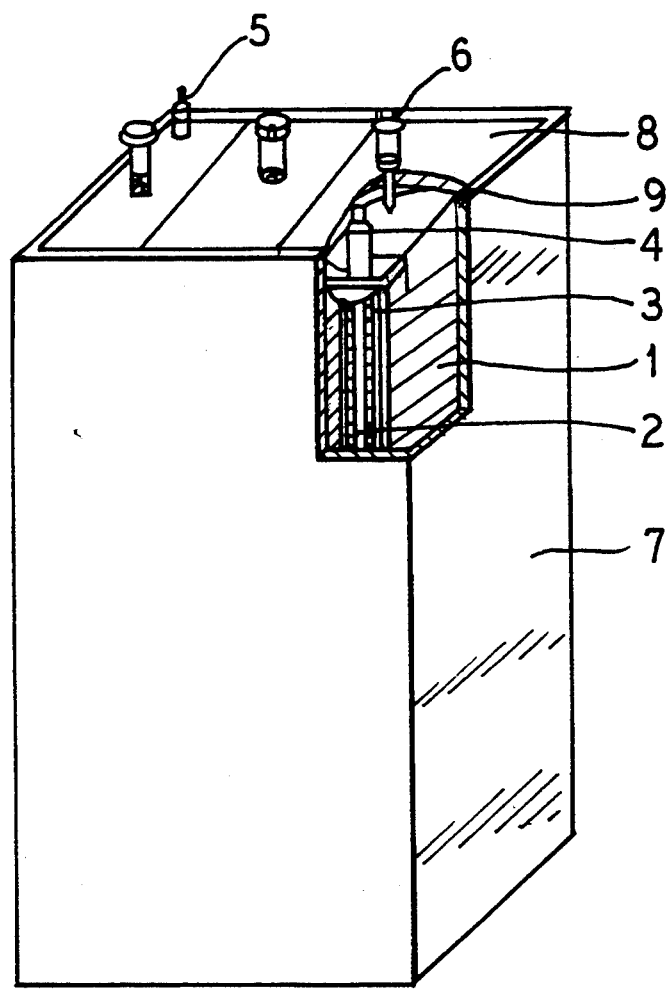
FIG. 1 is a perspective view with a partly broken away portion showing the battery of one embodiment of the invention.

In a large capacity nickel-hydride battery of FIG. 1, reference number 1 is a negative electrode plate, reference number 2 is a positive electrode plate, reference number 3 is a separator, reference number 4 is a terminal of the negative electrode plates, reference number 5 is a terminal of the positive electrode plates, reference number 6 is a vent, reference number 7 is a case, reference number 8 is a cover of the battery and reference number 9 is a sealing rubber.

EXAMPLE 2

Figure 2:
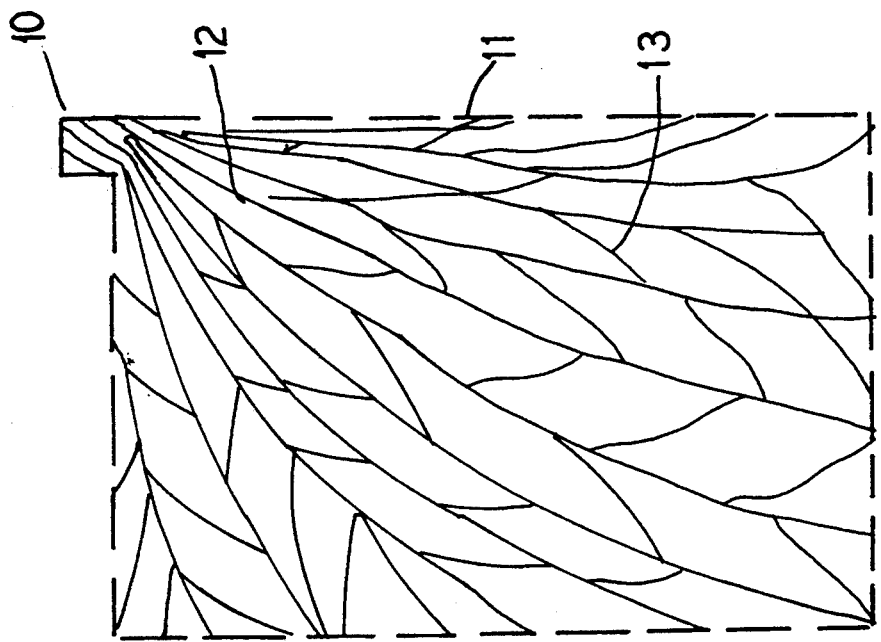
FIG. 2 is a schematic plan view of a root-like electrode plate for current-collecting before electric plating according to an embodiment of the invention.

A nickel plate with 120 mm in length, 100 mm in breadth and 0.8 mm in thickness was punched by a conventional punching machine to form a root-like net (referring to FIG. 2). The net was coated with nickel by a conventional electric plating method. After the electric plating, the net appears more like the root (referring to FIG. 3). In FIGS. 2 and 3, reference number 10 is an ear of the electrode plate, reference number 11 is a root-like net, reference number 12 is a stem and reference number 13 is a branch. The net was placed between two pieces of foam plastic with 100 mm in length, 100 mm in breadth and 5 mm in thickness, Nickel was coated on the foam plastic by a conventional chemical plating method. After coating, the foam plastic was burned out to form a foam nickel coated net.

360 g of hydrogen storage alloy powder of mischmetal with 300 mAh/g of electrochemical capacity were mixed with 2% of PVA. The amount of the PVA was nine times that of the alloy powder. After mixing, the mixture was pasted on the electrode plate and pressed under 1 ton/cm$^2$ force to form a negative electrode plate. Nickel oxide, after being treated by a known method, was pasted on the electrode plate to form a positive electrode.

A nickel-hydride battery was assembled by using the positive electrode (over 150%) and the negative electrode. Table 1 gives the comparison data between the nickel-hydride battery with the net of the invention and the nickel-hydride battery without the net of the invention.

TABLE 1

| Type of the Batteries | Nickel-Hydride Battery with the Net for Current Collecting | | | Nickel-Hydride Battery without the Net for Current Collecting | | |
| --- | --- | --- | --- | --- | --- | --- |
| Discharge Multiple Rate | 0.2 C | 1 C | 3 C | 0.2 C | 1 C | 3 C |
| Capacity 100 AH | 106 | 96 (AH) | 80 | 64 | 42 (AH) | — |
| Coefficient of Utilization of the Active Material | 88.3% | 80% | 66.6% | 53% | 35% | — |

What is claimed is:

1. An electrode for a nickel-hydride battery comprising:
   an electrode plate and an active material attached to the electrode plate;
   a metal net coated with foam nickel on the electrode plate, said net having a plurality of stems and a plurality of branches linked to the stems; and
   a protruded ear on one side of the net wherein most of the stems diverge from said ear towards edges of said net wherein said stems are thicker than said branches and become thinner gradually from their ends near said ear whereby said net is in the form of a root.

2. The electrode according to claim 1 wherein said net has a thickness between 0.5–1.5 mm.

3. A nickel-hydride battery comprising:
   a container;
   a negative electrode;
   a positive electrode;
   a separator and an electrolyte wherein said negative electrode is formed by an electrode plate, said electrode plate comprising a metal net coated with foam nickel on the electrode plate and further wherein said net has a plurality of stems and a plurality of branches linked to the stems; and
   a protruded ear on one side of the net wherein most of the stems diverge from said ear towards edges of said net wherein said stems are thicker than said branches and become thinner gradually from their ends near said ear whereby said net is in the form of a root and further wherein said active material is a hydrogen storage alloy powder, and said positive electrode is formed by an electrode plate, said electrode plate comprising a metal net coated with foam nickel on the electrode plate and further wherein said net has a plurality of stems and a plurality of branches linked to the stems; and
   a protruded ear on one side of the net wherein most of the stems diverge from said ear towards edges of said net wherein said stems are thicker than said branches and become thinner gradually from their ends near said ear whereby said net is in the form of a root and further wherein said active material is nickel oxide.

4. The nickel-hydride battery according to claim 3 wherein said ear is constructed and arranged on a top side of the net.

5. The nickel-hydride battery according to claim 3 wherein said hydrogen storage alloy powder is an alloy powder of a rare earth system

* * * * *